(12) United States Patent
Liang

(10) Patent No.: US 9,626,783 B2
(45) Date of Patent: Apr. 18, 2017

(54) HELMET-USED DEVICE CAPABLE OF AUTOMATICALLY ADJUSTING POSITIONS OF DISPLAYED INFORMATION AND HELMET THEREOF

(71) Applicant: KDH-DESIGN SERVICE INC., Neihu District, Taipei (TW)

(72) Inventor: Younger Liang, Taipei (TW)

(73) Assignee: KDH-Design Service Inc., Taipei (TW)

( * ) Notice: Subject to any disclaimer, the term of this patent is extended or adjusted under 35 U.S.C. 154(b) by 0 days.

(21) Appl. No.: 14/612,228

(22) Filed: Feb. 2, 2015

(65) Prior Publication Data
US 2016/0225173 A1    Aug. 4, 2016

(51) Int. Cl.
G06T 11/60 (2006.01)
G06F 3/01 (2006.01)
G09G 3/00 (2006.01)
G02B 27/01 (2006.01)

(52) U.S. Cl.
CPC .......... *G06T 11/60* (2013.01); *G02B 27/0172* (2013.01); *G06F 3/013* (2013.01); *G09G 3/002* (2013.01); *G02B 2027/011* (2013.01); *G02B 2027/0138* (2013.01); *G09G 2340/0464* (2013.01); *G09G 2380/10* (2013.01)

(58) Field of Classification Search
CPC ............ G02B 27/017; G02B 2027/014; G02B 27/0093; G02B 2027/0198; G06F 3/013; G06F 3/011; G06F 3/012; H04N 13/0459
See application file for complete search history.

(56) References Cited

U.S. PATENT DOCUMENTS

| | | | |
|---|---|---|---|
| 2010/0164702 A1* | 7/2010 | Sasaki ..................... | G01B 21/22 340/438 |
| 2011/0213664 A1* | 9/2011 | Osterhout ............ | G02B 27/017 705/14.58 |
| 2012/0259546 A1* | 10/2012 | Kim ........................ | G02B 27/01 701/527 |
| 2013/0021373 A1* | 1/2013 | Vaught ................. | G02B 27/017 345/633 |
| 2013/0076787 A1* | 3/2013 | Mathieu ..................... | B60R 1/00 345/633 |
| 2013/0162632 A1* | 6/2013 | Varga ..................... | G06T 19/006 345/419 |
| 2014/0118357 A1* | 5/2014 | Covington .............. | G06F 3/013 345/473 |
| 2014/0333773 A1* | 11/2014 | Davis ................... | H04N 5/2252 348/158 |

(Continued)

*Primary Examiner* — Jeffrey Chow
(74) *Attorney, Agent, or Firm* — C. G. Mersereau; Nikolai & Mersereau, P.A.

(57) ABSTRACT

A helmet-used device capable to automatically adjusting positions of displayed information and a helmet thereof. The device includes an angle detection unit, an eyeball detection unit, a processing unit and a projector unit. The processing unit serves to receive a first detection signal to correct an image signal and receive a second detection signal to adjust output positions of multiple graphic and text data of the image signal. The projector unit serves to receive the image signal to generate and project an image. The graphic and text information contained in the projected image is automatically adjusted to a visible position corresponding to the eyes of the wearer for the wearer to conveniently watch the displayed information.

8 Claims, 5 Drawing Sheets

(56) References Cited

U.S. PATENT DOCUMENTS

| | | | |
|---|---|---|---|
| 2015/0049004 A1* | 2/2015 | Deering | G02B 27/0172 345/8 |
| 2015/0077312 A1* | 3/2015 | Wang | G02B 27/017 345/7 |
| 2016/0044276 A1* | 2/2016 | Shearman | A42B 3/042 348/207.1 |
| 2016/0093081 A1* | 3/2016 | Kim | G06F 3/012 345/156 |

* cited by examiner

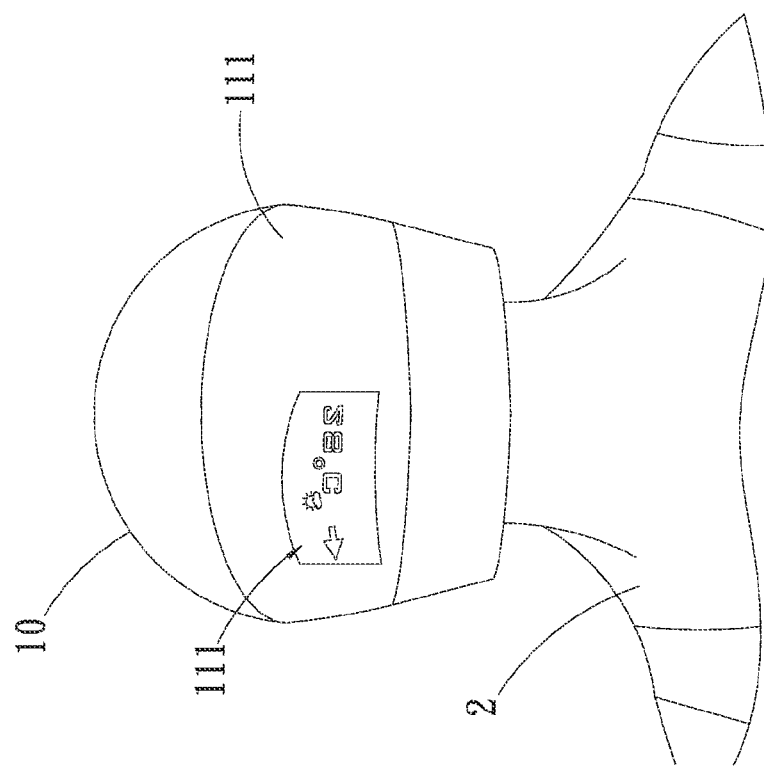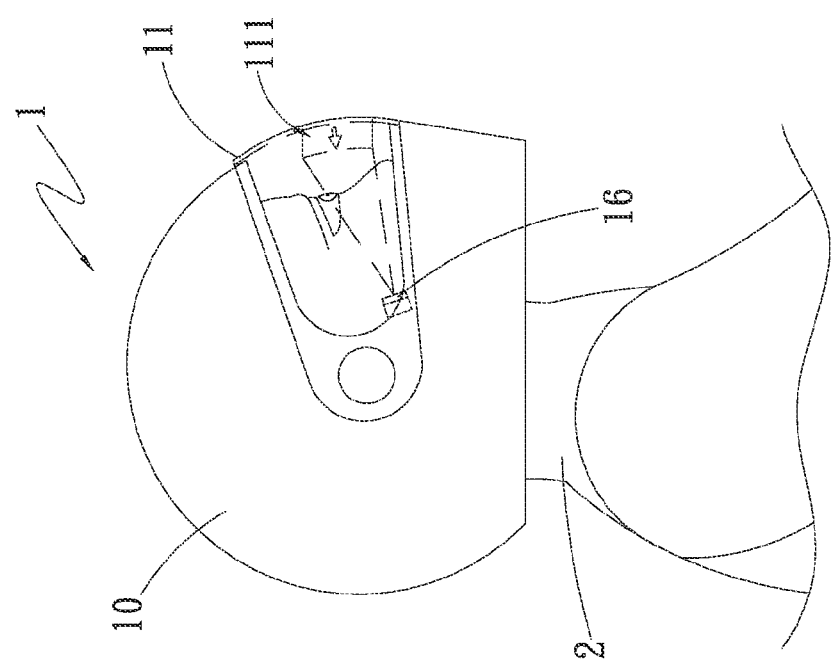
Fig. 4

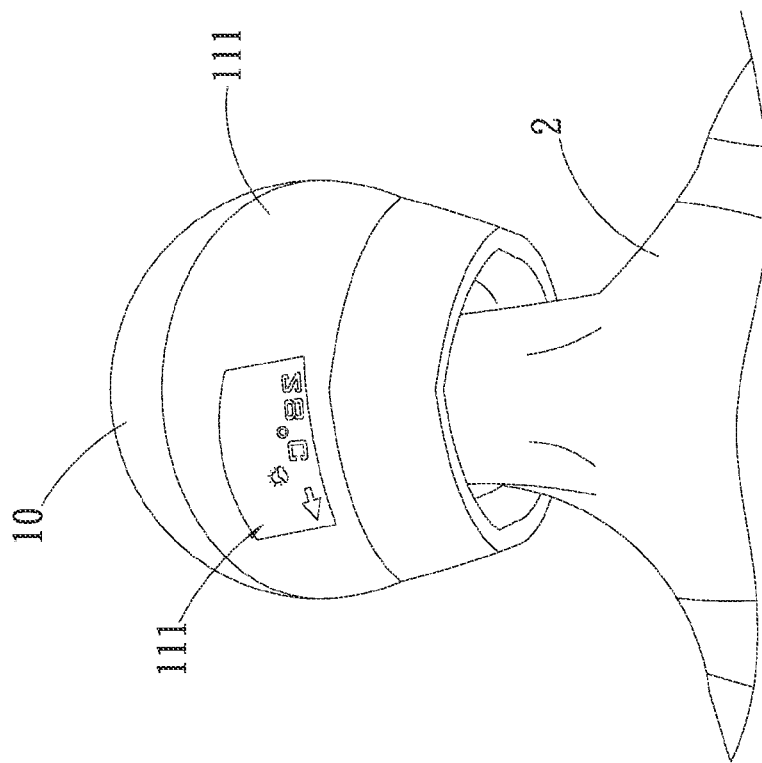
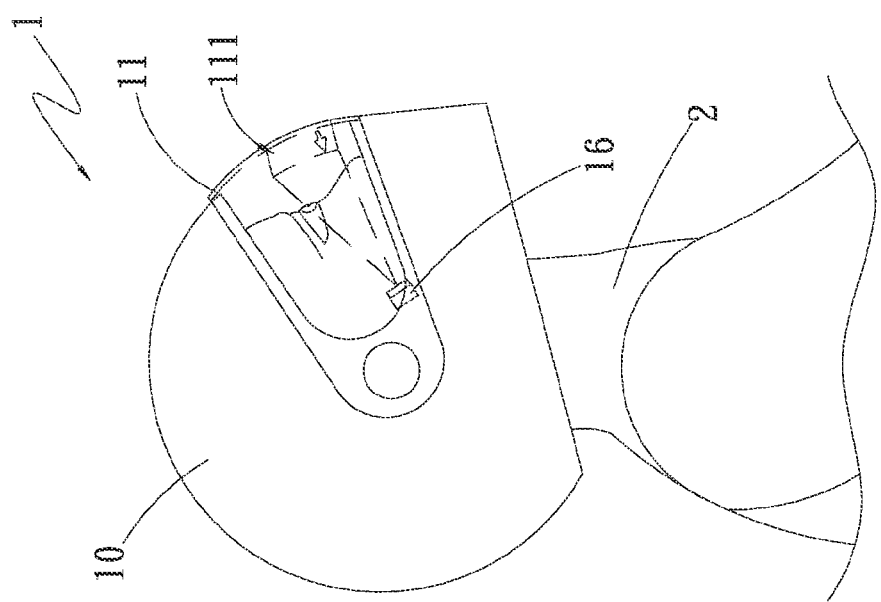
Fig. 5

HELMET-USED DEVICE CAPABLE OF AUTOMATICALLY ADJUSTING POSITIONS OF DISPLAYED INFORMATION AND HELMET THEREOF

BACKGROUND OF THE INVENTION

1. Field of the Invention

The present invention relates generally to a helmet, and more particularly to a helmet-used device capable to automatically adjusting positions of displayed information and a helmet thereof. The device is able to automatically correct a projected image to avoid keystone distortion of the image and is able to automatically adjust the output positions of the graphic and text information of the projected image.

2. Description of the Related Art

U.S. Pat. No. 5,646,784 discloses a conventional helmet display system. The helmet display system has a visor disposed on the helmet. A holographic combiner is formed on the visor. Two image projectors are disposed in the helmet for projecting images onto the holographic combiner on the visor. The holographic combiner serves to reflect the projected images to the eyes of a wearer. Also, the eyes of the wearer can see outer side through the visor.

There is a trend to add information display function to the helmet. However, it is disclosed in any of the conventional techniques how to prevent the image projected to the visor from distorting or deforming when the helmet is under affection of external environment (such as wind blow or shaking).

SUMMARY OF THE INVENTION

It is therefore a primary object of the present invention to provide a helmet-used device capable to automatically adjusting positions of displayed information and a helmet thereof. The device is able to automatically correct a projected image in keystone correction manner and automatically adjust the output positions of the graphic and text information of the projected image.

It is a further object of the present invention to provide the above helmet-used device capable to automatically adjusting positions of displayed information. The device is able to automatically adjust the positions of the displayed information for the wearer to conveniently watch the displayed information.

It is still a further object of the present invention to provide a helmet, which is able to automatically correct a projected image in keystone correction manner and automatically adjust the output positions of the graphic and text information of the projected image.

It is still a further object of the present invention to provide the above helmet, which is able to automatically adjust the positions of the displayed information for the wearer to conveniently watch the displayed information.

To achieve the above and other objects, the helmet-used device capable of automatically adjusting positions of displayed information of the present invention includes an angle detection unit, an eyeball detection unit, a processing unit and a projector unit. The angle detection unit is electrically connected to the processing unit for detecting inclination angle of the helmet to generate a first detection signal and transmit the first detection signal to the processing unit. The first detection signal is variable with the change of the inclination angle of the helmet. The eyeball detection unit is electrically connected to the processing unit for detecting motions of eyes of a wearer to generate a second detection signal and transmit the second detection signal to the processing unit. The second detection signal is variable with the motions of the eyes of the wearer. The processing unit serves to receive the first and second detection signals and output an image signal. The projector unit is electrically connected to the processing unit for receiving the image signal to generate and project an image onto a display section of the helmet. According to the change of the first detection signal, the processing unit corrects the image signal in keystone correction manner. According to the change of the second detection signal, the processing unit adjusts output positions of multiple graphic and text data of the image signal, whereby the graphic and text information contained in the image projected on the display section is adjusted to a visible position corresponding to the eyes of the wearer. Accordingly, the helmet of the present invention is able to effectively avoid keystone distortion of the projected image and automatically adjust the graphic and text information of the projected image to a visible position corresponding to the eyes of the wearer for the wearer to conveniently watch the displayed information.

Still to achieve the above and other objects, the helmet of the present invention includes an angle detection unit, an eyeball detection unit, a processing unit, a helmet body and a projector unit. The helmet body has a visor and a display section. The visor is disposed on front side of the helmet body and the display section is positioned on the visor. The angle detection unit is disposed on the helmet body for detecting inclination angle of the helmet to generate a first detection signal. The first detection signal is variable with the change of the inclination angle of the helmet. The eyeball detection unit is disposed in the helmet body corresponding to eyes of a wearer for detecting motions of the eyes of the wearer to generate a second detection signal. The second detection signal is variable with the motions of the eyes of the wearer. The processing unit is disposed in the helmet body and electrically connected to the angle detection unit and the eyeball detection unit for receiving the first and second detection signals and outputting an image signal. The projector unit is disposed in the helmet body to face the visor and electrically connected to the processing unit for receiving the image signal to generate and project an image onto the display section of the helmet. According to the change of the first detection signal, the processing unit corrects the image signal in keystone correction manner. According to the change of the second detection signal, the processing unit adjusts output positions of multiple graphic and text data of the image signal, whereby the graphic and text information contained in the image projected on the display section is adjusted to a visible position corresponding to the eyes of the wearer. Accordingly, the helmet of the present invention is able to effectively avoid keystone distortion of the projected image and automatically adjust the graphic and text information of the projected image to a visible position corresponding to the eyes of the wearer for the wearer to conveniently watch the displayed information.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4 is a view showing that the wearer wears the helmet of the present invention in a second aspect; and FIG. 5 is a view showing that the wearer wears the helmet of the present invention in a third aspect.

DETAILED DESCRIPTION OF THE PREFERRED EMBODIMENTS

Figure 1:
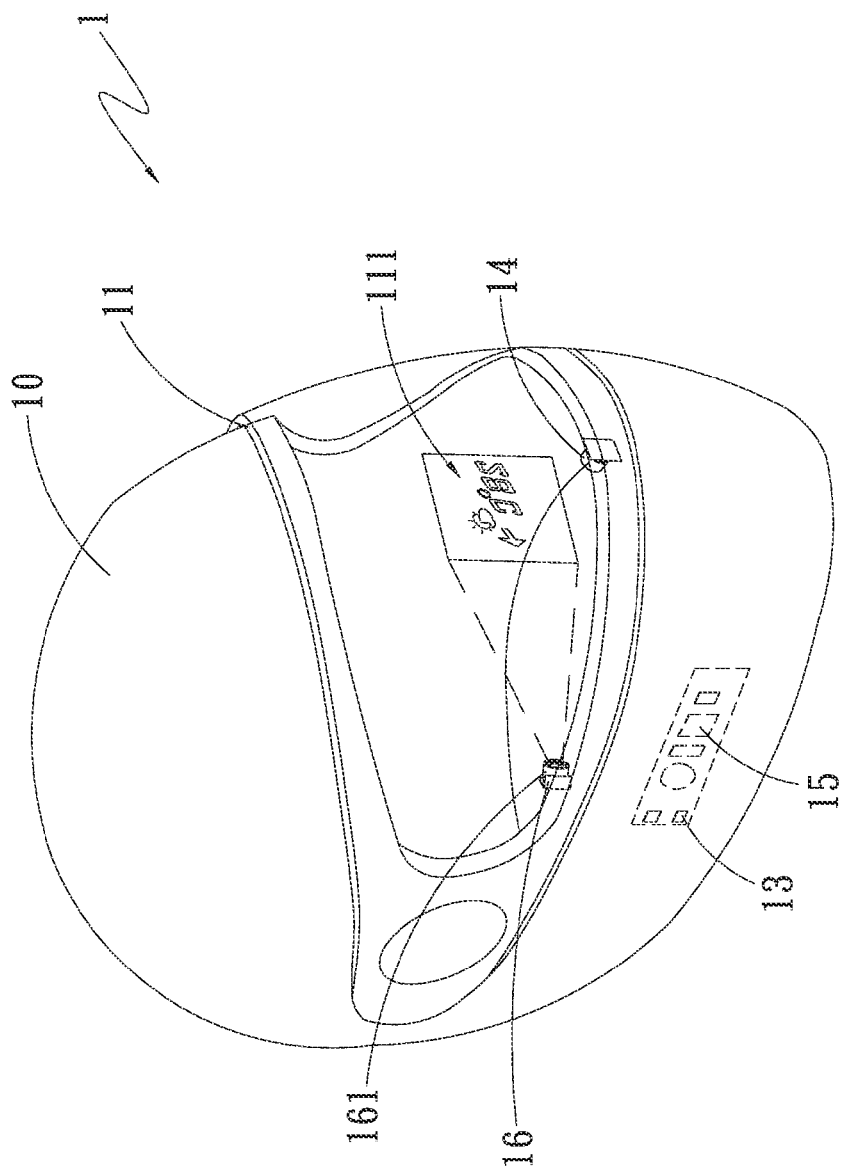
FIG. 1 is a perspective view of a preferred embodiment of the helmet of the present invention.
Figure 2:
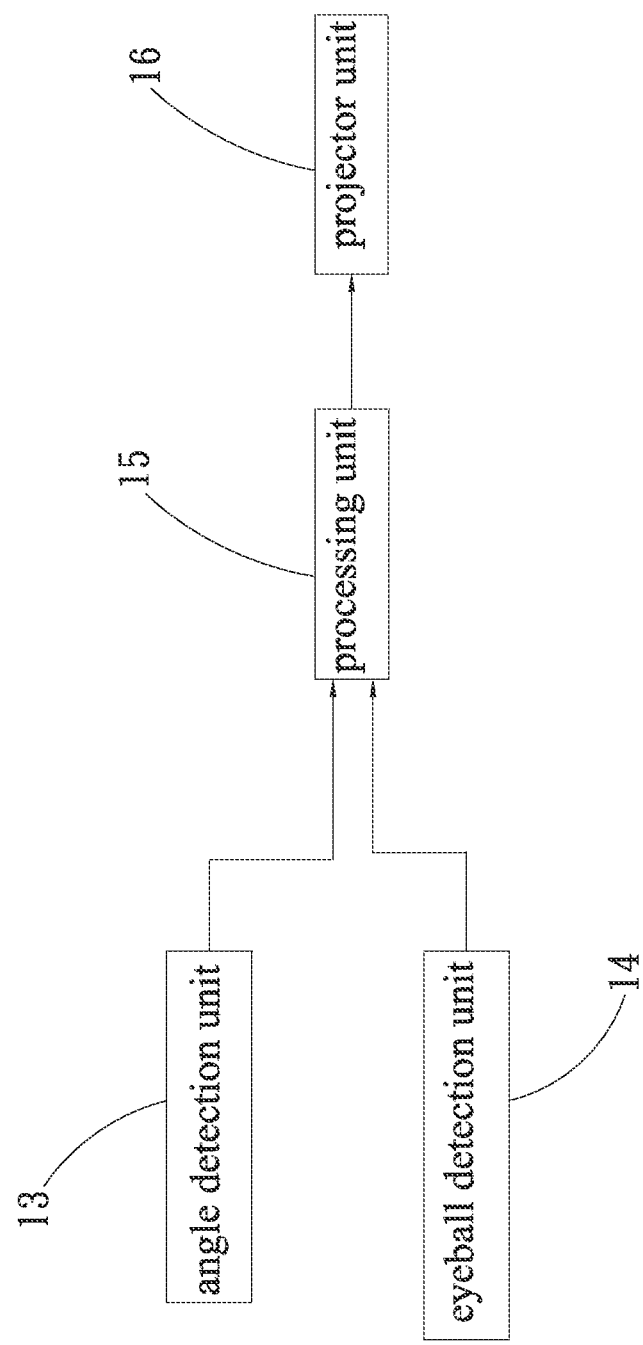
FIG. 2 is a block diagram of the preferred embodiment of the helmet of the present invention.

Please refer to FIGS. 1 and 2. FIG. 1 is a perspective view of a preferred embodiment of the helmet of the present invention. FIG. 2 is a block diagram of the preferred embodiment of the helmet of the present invention. Also referring to FIG. 3, the helmet-used device capable of automatically adjusting positions of displayed information of the present invention includes an angle detection unit 13, an eyeball detection unit 14, a processing unit 15 and a projector unit 16. The helmet 1 is for a wearer 2 to wear and use. The helmet 1 includes the angle detection unit 13, the eyeball detection unit 14, the processing unit 15, a helmet body 10 and the projector unit 16. The helmet body 10 has a visor 11 and a display section 111. The visor 11 is disposed on front side of the helmet body 10 and the display section 111 is positioned on the visor 11. In this embodiment, the angle detection unit 13 is, but not limited to, a gyroscope for illustration purposes only. The angle detection unit 13 is disposed on the helmet body 10 for detecting the inclination angle of the helmet 1 to generate a first detection signal. The first detection signal is variable with the change of the inclination angle of the helmet 1. The first detection signal contains the inclination angle data of the helmet 1.

In this embodiment, the eyeball detection unit 14 is, but not limited to, one video camera for illustration purposes only. In practice, according to the requirement of detection precision, a user can alternatively previously design and employ two image cameras to respectively correspondingly detect the eyes of the wearer 2. The eyeball detection unit 14 is disposed in the helmet body 10 corresponding to the eyes of the wearer 2 for detecting the motion of the wearer's eyes, (such as the leftward motion, rightward motion, upward motion or downward motion of the wearer's eyeballs) to generate a second detection signal. The second detection signal is variable with the motion of the wearer's eyes. The second detection signal contains the motion data of the eyeballs of the wearer 2.

The processing unit 15 is disposed in the helmet body 10 and electrically connected to the angle detection unit 13 and the eyeball detection unit 14. The processing unit 15 serves to receive the first and second detection signals and output an image signal. According to the change of the received first detection signal, the processing unit 15 corrects the image signal in keystone correction manner. That is, after the angle detection unit 13 is used to detect the inclination angle of the helmet 1, the angle detection unit 13 transmits the first detection signal containing the inclination angle data of the helmet 1 to the processing unit 15. According to the first detection signal, the processing unit 15 rectifies (or corrects) the image signal in keystone correction manner. Also, according to the change of the second detection signal, the processing unit 15 adjusts the output positions (or display positions) of multiple graphic and text data of the image signal. That is, after the eyeball detection unit 14 is used to detect the moving direction of the eyeballs of the wearer 2 of the helmet 1, the eyeball detection unit 14 transmits the second detection signal containing the motion data of the eyeballs of the wearer 2 to the processing unit 15. According to the second detection signal, the processing unit 15 adjusts the output positions of the multiple graphic and text data of the image signal. For example, in the case that the eyeball detection unit 14 detects that the eyeballs of the wearer 2 move rightward, according to the second detection signal, the processing unit 15 will automatically adjust the multiple graphic and text data in the image signal to move rightward. Therefore, the graphic and text information contained in the image projected on the display section 111, (such as map information, warning or alert information, direction information, navigation map information, weather information, driving information, icon graphic information, text information or the combination thereof) can be adjusted to a visible position corresponding to the eyes of the wearer 2. The graphic and text information includes the aforesaid graphic and text data.

Figure 3:
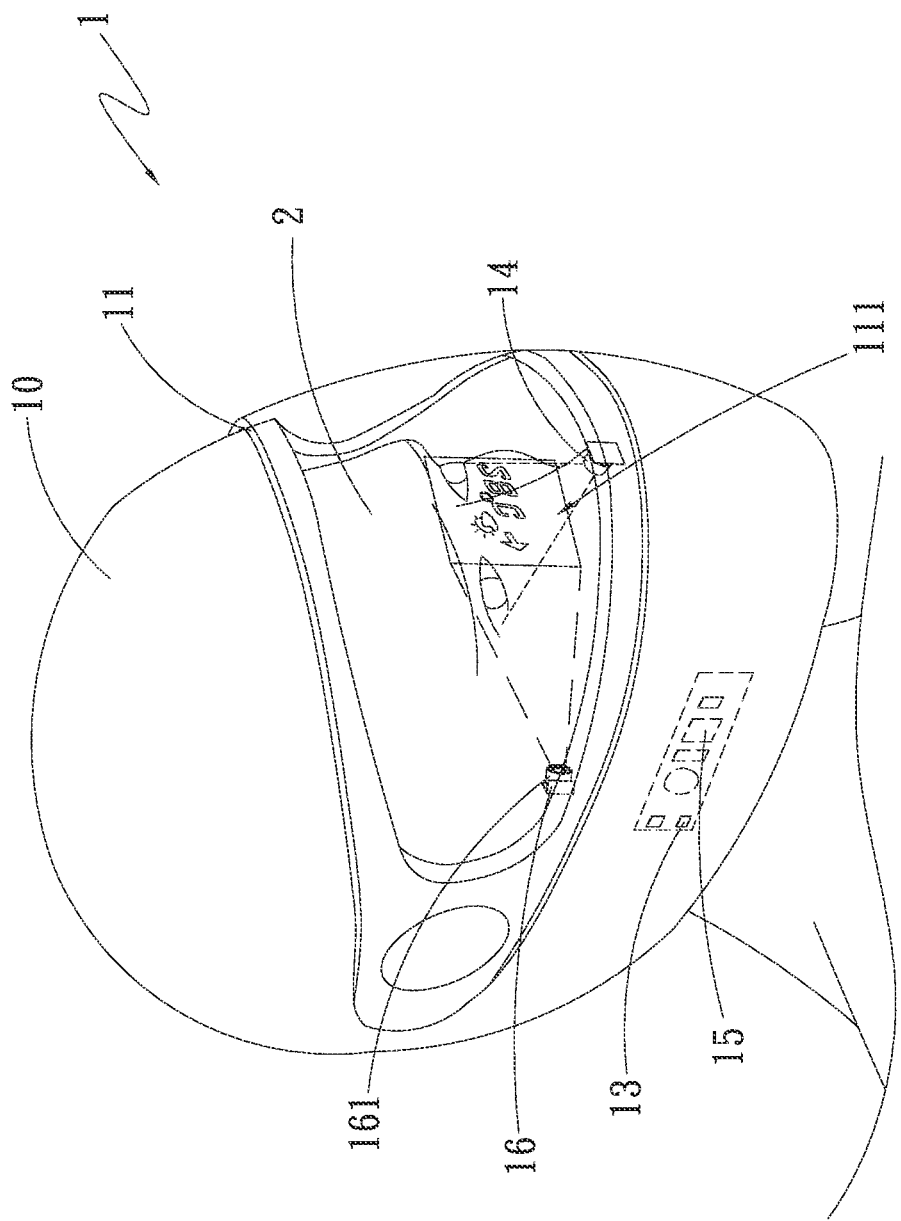
FIG. 3 is a perspective view showing that a wearer wears the helmet of the present invention in a first aspect.

Please now refer to FIGS. 1 to 3. The projector unit 16 is a micro-projector. The projector unit 16 is electrically connected to the processing unit 15. The projector unit 16 is disposed in the helmet body 10 to face the visor 11. In this embodiment, the projector unit 16 is disposed on an inner side of the helmet body 10 corresponding to the face of the wearer 2. A projection lens 161 of the projector unit 16 is, but not limited to, forward directed to the display section 111 of the visor 11 for illustration purposes only. The projector unit 16 serves to receive the image signal to generate and project an image onto the display section 111 of the visor 11 of the helmet 1. Accordingly, the wearer 2 in the helmet 1 can see the display information, (that is, the aforesaid graphic and text data) contained in the image projected on the display section 111. Also, the wearer 2 can see the outer side through the visor 11.

The following is an example for illustration:

Please refer to FIG. 3 and complementarily refer to FIGS. 1 and 2. When the wearer 2 wears the helmet 1 and rides a transportation tool (such as a motorcycle), in the case that the helmet 1 of the wearer 2 is affected by the external environment (such as wind blow or shaking) and moved upward (or the wearer 2 automatically lifts his head), the helmet 1 will move upward with the wearer's head (as shown in FIG. 5). At this time, the angle detection unit 13 readily detects (or senses) the inclination angle of the helmet 1 to generate the first detection signal to the processing unit 15. According to the first detection signal, the processing unit 15 corrects the image signal in keystone correction manner. At the same time, the eyeball detection unit 14 readily detects that the eyeballs of the wearer 2 move downward to generate the second detection signal to the processing unit 15. According to the second detection signal, the processing unit 15 automatically adjusts the multiple graphic and text data contained in the image signal to move downward. Thereafter, the processing unit 15 generates an image signal, which has been keystone-corrected and in which the output positions have been automatically adjusted. The processing unit 15 then transmits the image signal to the projector unit 16. After receiving the image signal, the projector unit 16 generates and projects an image onto the display section 111 of the visor 11. The multiple graphic and text data contained in the projected image, (such as the direction information and weather information) will be downward moved from the center of the display section 111 to a visible position of the wearer's eyes, (where the graphic and text data on the display section 111 will be automatically adjusted to be parallel to the running road face for the wearer 2 to conveniently watch).

In the case that at this time, the head of the wearer 2 moves downward back to its home position, (where the helmet 1 of the wearer 2 is parallel to the running road face as shown in FIG. 4), the helmet 1 will move downward with the head of the wearer 2 back to its home position, whereby the angle detection unit 13 readily detects (or senses) the inclination angle of the helmet 1 to generate a first detection signal to the processing unit 15. According to the first detection signal, the processing unit 15 corrects the image signal in keystone correction manner. At the same time, the eyeball detection unit 14 readily detects that the eyeballs of the wearer 2 move upward back to the axis of the eyes (or so-called eye axis) to generate a second detection signal to the processing unit 15. According to the second detection signal, the processing unit 15 automatically adjusts the multiple graphic and text data contained in the image signal to move upward. Thereafter, the processing unit 15 generates an image signal, which has been keystone-corrected and in which the output positions have been automatically adjusted. The processing unit 15 then transmits the image signal to the projector unit 16. After receiving the image signal, the projector unit 16 generates and projects an image onto the display section 111 of the visor 11. The multiple graphic and text data contained in the projected image, (such as the direction information and weather information) will be upward moved from the lower side of the display section 111 back to the center and adjusted to a visible position corresponding to the wearer's eyes for the wearer 2 to conveniently watch the displayed information.

In conclusion, in comparison with the conventional technique, the present invention has the following advantages:
1. The projected image is prevented from distorting or deforming.
2. The graphic and text data contained in the projected image can be automatically adjusted with the change of the inclination angle of the helmet 1, whereby the graphic and text data are kept as parallel to the running road face as possible for a wearer to conveniently watch the displayed information.

The present invention has been described with the above embodiments thereof and it is understood that many changes and modifications in the above embodiments can be carried out without departing from the scope and the spirit of the invention that is intended to be limited only by the appended claims.

What is claimed is:
1. A helmet-used device capable to automatically adjusting positions of displayed information, comprising:
an angle detection unit for detecting inclination angle of the helmet to generate a first detection signal, the first detection signal being variable with the change of the inclination angle of the helmet;
an eyeball detection unit for detecting motions of eyeball movement of eyes of a wearer to generate a second detection signal, the second detection signal being variable with the motions of the eyeball movement of the eyes of the wearer;
a processing unit electrically connected to the angle detection unit and the eyeball detection unit for receiving the first and second detection signals and outputting an image signal; and
a projector unit electrically connected to the processing unit for receiving the image signal to generate and project an image onto a display section of the helmet, according to the change of the first detection signal, the processing unit correcting the image signal in keystone correction manner, according to the change of the second detection signal, the processing unit adjusts and moves output positions of multiple graphic and text data of the image signal corresponding to an eyeball movement direction of the eyes of the wearer, whereby the graphic and text information contained in the image projected on the display section is adjusted to be parallel with a riding road surface and moved along the eyeball movement direction of the eyes to a visible position corresponding to the eyes of the wearer.

2. The helmet-used device capable to automatically adjusting positions of displayed information as claimed in claim 1, wherein the graphic and text information includes the graphic and text data.

3. The helmet-used device capable to automatically adjusting positions of displayed information as claimed in claim 1, wherein the angle detection unit is a gyroscope and the eyeball detection unit is a video camera.

4. The helmet-used device capable to automatically adjusting positions of displayed information as claimed in claim 1, wherein the projector unit is a micro-projector.

5. A helmet comprising:
a helmet body having a visor and a display section, the visor being disposed on front side of the helmet body and the display section is positioned on the visor;
an angle detection unit disposed on the helmet body for detecting inclination angle of the helmet to generate a first detection signal, the first detection signal being variable with the change of the inclination angle of the helmet;
an eyeball detection unit disposed in the helmet body corresponding to eyes of a wearer for detecting motions of eyeball movement of the eyes of the wearer to generate a second detection signal, the second detection signal being variable with the motions of the eyeball movement of the eyes of the wearer;
a processing unit disposed in the helmet body and electrically connected to the angle detection unit and the eyeball detection unit for receiving the first and second detection signals and outputting an image signal; and
a projector unit disposed in the helmet body to face the visor and electrically connected to the processing unit for receiving the image signal to generate and project an image onto the display section of the helmet, according to the change of the first detection signal, the processing unit correcting the image signal in keystone correction manner, according to the change of the second detection signal, the processing unit adjusting and moving output positions of multiple graphic and text data of the image signal corresponding to an eyeball movement direction of the eyes of the wearer, whereby the graphic and text information contained in the image projected on the display section is adjusted to be parallel with a riding road surface and moved to a visible position along the eyeball movement direction of the eyes corresponding to the eyes of the wearer.

6. The helmet as claimed in claim 5, wherein the graphic and text information includes the graphic and text data.

7. The helmet as claimed in claim 5, wherein the angle detection unit is a gyroscope and the eyeball detection unit is a video camera.

8. The helmet as claimed in claim 5, wherein the projector unit is a micro-projector.

* * * * *